United States Patent
Stark et al.

(10) Patent No.: US 7,058,154 B1
(45) Date of Patent: Jun. 6, 2006

(54) SYSTEMS AND METHODS FOR MANAGING ASSETS USING AN INTERACTIVE DATABASE

(75) Inventors: Randal Raymond Stark, Morgan Hill, CA (US); Steven Max Buckner, Gilroy, CA (US); Ahdee Quan Chan, Morgan Hill, CA (US); Sampath Ranganath, San Jose, CA (US)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 09/634,434

(22) Filed: Aug. 8, 2000

(51) Int. Cl.
*G21C 19/00* (2006.01)
(52) U.S. Cl. .................... 376/260; 228/102
(58) Field of Classification Search ............... 369/59; 700/17; 705/26, 27; 703/2; 711/111
See application file for complete search history.

(56) References Cited

U.S. PATENT DOCUMENTS

| | | | |
|---|---|---|---|
| 4,908,775 A * | 3/1990 | Palusamy et al. ............. 702/34 |
| 5,311,562 A * | 5/1994 | Palusamy et al. ........... 376/215 |
| 5,331,579 A * | 7/1994 | Maguire et al. ................ 703/2 |
| 5,768,142 A | 6/1998 | Jacobs |
| 5,826,252 A | 10/1998 | Wolters, Jr. et al. |
| 5,875,110 A | 2/1999 | Jacobs |
| 5,930,315 A | 7/1999 | Morman et al. |
| 6,122,239 A * | 9/2000 | Bodo et al. ................... 369/59 |
| 6,421,571 B1 * | 7/2002 | Spriggs et al. ................ 700/17 |

FOREIGN PATENT DOCUMENTS

JP        09044231        * 2/1997

OTHER PUBLICATIONS

"Nuclear device could monitor cooling tube cracking" AP, Morning Call; Allentown, Pa; Jul. 25, 1984.*
"Nimo awaits OK on delay the NRC is considering whether the utility can put off a reinspection at one of its Nuclear Power Plants"; Mary Hill' The Post-Standard; Syracuse, N.Y.; Oct. 30, 1998.*
"Cracks pose threat to nuclear plant"; The Times, London; Dec. 8, 1994.*

* cited by examiner

*Primary Examiner*—Wynn W. Coggins
*Assistant Examiner*—R. E. Rhode, Jr.
(74) *Attorney, Agent, or Firm*—Armstrong Teasdale LLP

(57) ABSTRACT

The disclosed invention is a system and a method utilizing a web-based interactive database to automate the process for managing internal components of a plant. The system captures all essential information and provides on-line up-to-date information upon request. The system provides valuable information to a customer to analyze the plant specific problem and offers inspection methods, mitigation methods and processes to resolve the problem.

74 Claims, 16 Drawing Sheets

Asset Management
Welcome to the Asset Management Program.
Please choose one of the following plants:
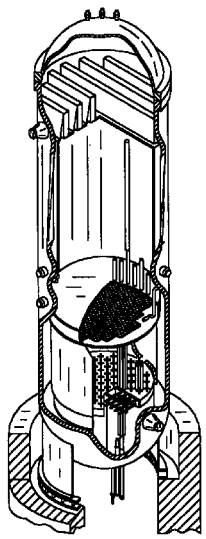
- Dresden 2 — 310
- Dressden 3 — 312
- LaSalle 1 — 316
- LaSalle 2 — 320
- Quad Cities 1 — 324
- Quad Cities 2 — 328
300
FIG. 4

You have chosen to review the Dresden 2 Asset Management Program.

Please choose one of the following internal components:

- Core Spray Internal Piping — 344
- Core Spray Sparger — 350
- Lower Plenum — 354
- Shroud — 356
- Shroud Support & Access Hole Cover — 368 / 360
- Jet Pump Diffuser — 364

- Jet Pump Riser & Riser Brace — 368 / 370
- Jet Pump Inlet Mixer — 374
- Jet Pump Sensing Line — 378
- Top Guide — 380
- Core Plate — 384

340

You have chosen to review the La Salle 1 Asset Management Program.

Please choose one of the following internal components:

- Core Spray Internal Piping — 404
- Core Pray Sparger — 410
- Lower Plenum — 414
- Shroud — 416
- Shroud Support & Access Hole Cover — 418, 420
- Jet Pump Diffuser — 424

- Jet Pump Riser & Riser Brace — 428, 430
- Jet Pump Inlet Mixer — 434
- Jet Pump Sensing Line — 438
- LPCI — 440
- Top Guide — 442
- Core Plate — 444

400

Core Spray Internal Piping

Background

Configuration Drawings
• Susceptibility

Field History

BWR Fleet

Inspection

Inspection Tools
   Baseline Inspection
   Inspection Experience

Mitigation

Methods

Repair

Methods

Back to AM Home Page

| Weld ID | Weld Description | Base Material | Filler Material | Susceptibility # (1 = Low; 5 = High) |
|---|---|---|---|---|
| P1 | Thermal sleeve to T-box (field weld) | T-box: 304 SST Unit 2 Thermal Sleeve 304L SST Unit 3 Thermal Sleeve 304 SST | ER308 or, ER308L | 3 |
| P2 | T-box cover to T-box (field weld with a creviced root) | T-box: 304 SST T-box Plug: 304 SST | ER308 or, ER308L | 4 |
| P3 | Pipe to T-box (unfavorable weld geometry, installation cold spring likely) | Pipe: 304 SST T-box: 304 SST | ER308 or, ER308L | 3 |
| P4a, b, c, d | Elbow to pipe welds (P4c & P4c shop, other field) | Elbow: 304 SST Pipe: 304 SST | Field welds ST filler of an unknown specification: shop welds ER 308 or, ER308L | 3 |
| NA | Core spray line bracket to RPV weld | Core Spray Bracket: 304 SST RPV: SST clad low alloy steel | SST filler of an unknown specification | 1 (no fleet failures in RPV brackets) |
| NA | Core spray clamp tack welds. | Core Spray Clamp: 304 SST Bolt: 304 or 316 SST | SST filler of an unknown specification | 2 (cracking unlikely to affect function) |
| P5 | Connecting Sleeve to Downcomer Pipe (field weld with a creviced root) | Connecting Sleeve: 304 SST Pipe: 304 SST | SST filler of an unknown specification | 5 |

FIG. 9

Core Spray Internal Piping

Background

Configuration Drawings
  Susceptibility

*Field History*

BWR Fleet

*Inspection*

• Inspection Tools
    Baseline Inspection
    Inspection Experience

*Mitigation*

Methods

*Repair*

Methods   530

*Back to AM Home Page*

| Plant /534 | Prod Line /538 | Com Opr /536 | Finding /540 | Description /532 | Cause /544 | Repair /548 |
|---|---|---|---|---|---|---|
| BRU2 | BWR/4 | Nov-75 | Jun-78 | Crack at upper elbow weld to horizontal header pipe (P4a) | 1 GSCC | Initially welded followed by replacement of upper piping |
| OYC1 | BWR/2 | Dec-69 | Jun-80 | Two visual indications, 4.5 long and 3 long on 6x5 eccentric reducer @ approx. 60 deg RPV azimuth | unknown | None? |
| PEB3 | BWR/4 | Dec-75 | Oct-85 | Cracks (approx 180 degrees) in 6 inch laterals on both sides of 240 degree tee box junction (P3) | 1 GSCC | Two brackets welded to pipes and tee box |
| BRU2 | BWR/4 | Nov-75 | Jan-88 | Crack in pipe (1978 replacement) at tee box junction (P3) | 1 GSCC / cold work suspected | Brackets welded to pipes at tee box under water by divers |
| FIT1 | BWR/4 | Jan-75 | Oct-88 | 180 deg crack at a weld in 190 deg vertical downcomer pipe. Weld approx 4" below pipe to elbow weld (an extra weld) | 1 GSCC | Split pipe coupling welded above and below crack |
| BRF3 | BWR/4 | Mar-77 | Oct-91 | Crack in pipe at tee box junction (P3) | 1 GSCC | Brackets welded to pipes at tee box under water by divers |

FIG. 10

Core Spray Internal Piping

*Background*

Configuration Drawings
● Susceptibility

*Field History*

BWR Fleet

*Inspection*

Inspection Tools
● Baseline Inspection
● Inspection Experience

*Mitigation*

Methods

*Repair*

Methods

*Back to AM Home Page*

560 —

For early detection of IGSCC initiated from the inside of core spray welds, which is the most likely initiation point for the creviced downcomer coupling welds (P5, P6 and P7), inspection must be by UT. Many plants are operating indefinitely under an analytical justification with periodic reinspection of known flaws. Accurate sizing is critical for the analytical evaluation of the core spray cracks. The tight cracking often seen in internal core spray welds makes UT the preferred inspection method for accurate sizing. BWRVIP-18 also allows longer reinspection intervals and reduced inspection scope with UT. Two recent developments in UT have made inspection of internal core spray piping by UT the preferred inspection method:

● Automated core spray inspection tooling, specifically designed for the internal core spray piping is now available. In one recent case this equipment performed a CSL examination in three days. This inspection tooling also permits other RPV work activities to be performed in parallel with core spray piping inspections (equipment can operate independent of the refueling bridge).

● UT inspection for the hidden P9 weld which "sees through the collar" has been qualified to the BWRVIP requirements in 1998.

Core Spray Internal Piping

Background

Configuration Drawings
  Susceptibility

*Field History*

BWR Fleet

*Inspection*

Inspection Tools
  Baseline Inspection
  • Inspection Experience

*Mitigation*

Methods

*Repair*

Methods

*Back to AM Home Page*

| WELD ID | LOCATION | INSPECTION METHOD | LOCATION / AZIMUTH |
|---|---|---|---|
| P1 | Thermal sleeve to T-box (field weld with a creviced root) | BWRVIP-18 | 5°, 185° |
| P2 | T-box plug to T-box (field weld with a creviced root) | Unit 1 not required or accessible because of T-box repair clamp. | 5°, 185° |
| P3 | Pipe to T-box (field weld, unfavorable weld geometry, installation cold spring likely) | Unit 1 not required or accessible because of T-box repair clamp. | 5°, 185° |
| P4a, b, c, d | Elbow to pipe welds (P4c & P4c shop, other field) | BWRVIP-18 | 81°, 289°, 109°, 261° |
| NA | Core spray clamp tack welds (Figure 1-5) | BWRVIP-18 | 65°, 125°, 245°, 305° |
| P5 | Connecting Sleeve to Downcomer Pipe (field weld with a creviced root) | BWRVIP-18 | 80°, 290°, 110°, 260° |
| P6 | Connecting Sleeve to Riser Coupling (field weld with a creviced root) | BWRVIP-18 | 80°, 290°, 110°, 260° |

FIG. 12

Core Spray Internal Piping

*Background*

Configuration Drawings
   Susceptibility

*Field History*

BWR Fleet

*Inspection*

• Inspection Tools
   Baseline Inspection
   Inspection Experience

*Mitigation*

Methods

*Repair*

• Methods

*Back to AM Home Page*

| Date or Frequency of Inspection ⟋594 | Inspection Method Used ⟋596 | Summarize the Following Information: Inspection Results, Reinspections ⟋598 | Failure Mode/ Location of Degradation ⟋600 | Comments ⟋602 |
|---|---|---|---|---|
| 1994 | VT-1 (1 mil) | IEB 80-13/NUREG of piping and welds in annulus. 120 degree indication at P3 weld. | Indication observed during 1994 on P3 of T-box was permanently repaired in 1996 | |
| 1996 | EVT-1, UT | Cracking in 260 deg and 290 deg downcomer elbow to thermal sleeve collar welds on elbow side; 260 deg had 1-4.6" indication and 290 deg had 1-3" and 1-4" adjacent indications; all indications detected by VT and confirmed with UT. (P8a) | | |
| 1998 | EVT-1, UT | Inspection of all Unit 1 P4d, P8a and P8b welds discovered a new indication on the 110° P4d weld. The new indication is 2.98" between 130° and 180° on elbow side of weld. | | |

Core Spray Internal Piping

*Background*

Configuration Drawings
● Susceptibility

*Field History*

BWR Fleet

*Inspection*

Inspection Tools
   Baseline Inspection
   Inspection Experience

*Mitigation*

Methods

*Repair*

Methods

*Back to AM Home Page*

| Mitigation Method | Welds Mitigated | Status | Plant Implemented |
|---|---|---|---|
| Hydrogen Water Chemistry | None of the core spray internal piping welds or the core spray nozzle thermal sleeve welds are protected by feedwater hydrogen injection. It is not practical to protect these welds with an increased hydrogen level. | Developed / Implemented | Implemented at Dresden 2 & 3 to protect piping and lower plenum intervals. |
| Noble metal chemical addition NobleChem™ in combination with hydrogen injection | Even noble metal chemical addition in combination will not afford adequate protection to the susceptible core spray internal piping welds. | Developed / Implemented | Implemented at Dresden 2. |
| Noble metal coating | Theoretically possible to protect some of the core spray welds. However, the configuration of and access to core spray internal piping welds would make noble metal coating of limited practical value. To be fully effective both sides of the relatively thin core spray welds would require coating application. | Developed / Implementation in process at this time | Being implemented on the ID of foreign 2 shroud H3 and H4 welds at this time. |
| Noble metal cladding | Theoretically possible to protect some of the core spray welds. However, the configuration of and access to core spray internal piping welds would make noble metal cladding of limited practical value. To be fully effective both sides of the relatively thin core spray welds would require cladding. | Developed / Implementation in process at this time | Being implemented on the ID of foreign incore monitor housings welds at this time. |

FIG. 14

Core Spray Internal Piping

*Background*

Configuration Drawings
   Susceptibility

*Field History*

• BWR Fleet

*Inspection*

Inspection Tools
   Baseline Inspection
   Inspection Experience

*Mitigation*

Methods

*Repair*

Methods

*Back to AM Home Page*

| ⌐634 | ⌐636 | ⌐638 | ⌐640 |
|---|---|---|---|
| Repair method | Welds Repaired | Status | Plant Implemented |
| Welded repair clamps | P3 pipe to T-box and individual elbow to pipe welds | Developed / Implemented | Several (not a permanent repair) |
| Local mechanical repair clamps | | Developed / Implemented | Dresden and others (not a permanent repair) |
| Lower sectional replacement | | Developed / Implemented | One core spray downcomer at Browns Ferry 3 |
| Full core spray line replacement | All | Some development required | Several BWRs currently pursuing, but no BWR has yet implemented |

SYSTEMS AND METHODS FOR MANAGING ASSETS USING AN INTERACTIVE DATABASE

BACKGROUND OF THE INVENTION

This invention relates generally to management of assets and, more particularly, to network-based systems and methods for management and maintenance of plant specific data using an interactive database.

Maintenance and repair is a serious issue particularly in a regulated government industry such as a nuclear power plant which is contractually obligated to maintain strict compliance relating to product performance and safety. For a business entity involved in a regulated industry such as defense, aircraft or nuclear, the on-going maintenance and repair of key components is important to maintain the overall functionality of the system. In such industries, documentation relating to maintenance and repair requirements of various products are typically supplied to customers through a combination of hard-copy files separately maintained by individual managers and/or a service department. Product manufacturers also provide product related repair information through printed service manuals. Notifications of repairs, either routine repairs or emergency repairs are generally made by personal contact or through individual mailings. The information, however, is static, and thus becomes quickly out-dated. Events also occur in the field that warrant immediate attention which requires re-printing the information and re-distributing the same. The customers facing the problem in the field rely on the service manuals to analyze their product repair problems. Inadequate field documentation not only causes frustrations to the customers but often results in system shut down.

Therefore, it would be desirable to have a network based system that provides useful up-to-date information to the customers without delay.

BRIEF SUMMARY OF THE INVENTION

In an exemplary embodiment, a searchable network based Asset Management system (AMS) collects, tracks and disseminates real time information regarding Boiling Water Reactor (BWR) internal components (also referred to as "Internals"). The system provides solutions to cracked Internals and also plant specific analysis to individual customers. The system allows access to the most recent information, which was previously not possible.

In an alternative embodiment, the system utilizes a web-based interactive database to automate the process for managing information to track proficient product performance and adherence to government regulatory requirements. The system captures BWR Internals information and provides on-line up-to-date information upon request. In one exemplary embodiment, the system utilizes a Structured Query Language (SQL) server database with a client user interface front-end for administration and a web interface for standard user input and reports. The system involves an information database that is used in the planning process and risk mitigation.

In yet another embodiment, the method for managing internal components of various plants uses a network based system including a server system coupled to a centralized interactive database and at least one client system. Information relating to each internal component of a specific plant is received by the system which stores the information into a centralized database, updates the centralized database with information received, cross-references the information received against the specific plant, and provides information in response to an inquiry.

The method provides a formalized process to meet and manage the Internals information pertaining to reactors and also helps achieve full compliance to government regulatory standards. The method utilizes a web application that analyzes either a single plant or multiple plants. For multiple plants, a summary sheet gives a quick overview of where the plants stand with respect to NRC standards. The user has an option to link from the summary sheet to any plant, or can link directly from the Home Page to any plant.

BWR Internals' information is stored in the centralized database. The network-based AMS provides convenient access to reactor Internals' information, including Internals' susceptibility, known fleet issues, known unit specific issues, up-to-date unit specific summary of inspections performed, inspection recommendations/guidelines for the components of concern, and contingency options (repair or mitigation). The database is integrated into customer outage planning and markets solutions.

Once into the plant Home Page, the user can access information on any reactor internal that has been analyzed. These include, but are not limited to, the following: core spray piping, core spray sparger, lower plenum, shroud, shroud support, jet pump, top guide, and core plate. The system also provides cost savings to any business entity by streamlining the management process associated with product safety compliance.

BRIEF DESCRIPTION OF THE DRAWINGS

FIG. 4 is an exemplary embodiment of a user interface displaying a home page of AMS shown in FIG. 2;

FIG. 9 is an exemplary embodiment of a user interface displaying susceptibility of welds relating to a component entitled "Core Spray Internal Piping";

FIG. 10 is an exemplary embodiment of a user interface displaying Boiling Water Reactor (BWR) Fleet history information of a component entitled "Core Spray Internal Piping";

FIG. 11 is an exemplary embodiment of a user interface displaying Inspection Tools information for a component entitled "Core Spray Internal Piping";

FIG. 12 is an exemplary embodiment of a user interface displaying Baseline Inspection information for a component entitled "Core Spray Internal Piping";

FIG. 13 is an exemplary embodiment of a user interface displaying most up-to-date Inspection Experience information for a component entitled "Core Spray Internal Piping";

FIG. 14 is an exemplary embodiment of a user interface displaying most up-to-date Mitigation Methods information for a component entitled "Core Spray Internal Piping";

FIG. 15 is an exemplary embodiment of a user interface displaying most up-to-date Repair Methods information for a component entitled "Core Spray Internal Piping"

DETAILED DESCRIPTION OF THE INVENTION

Figure 1:
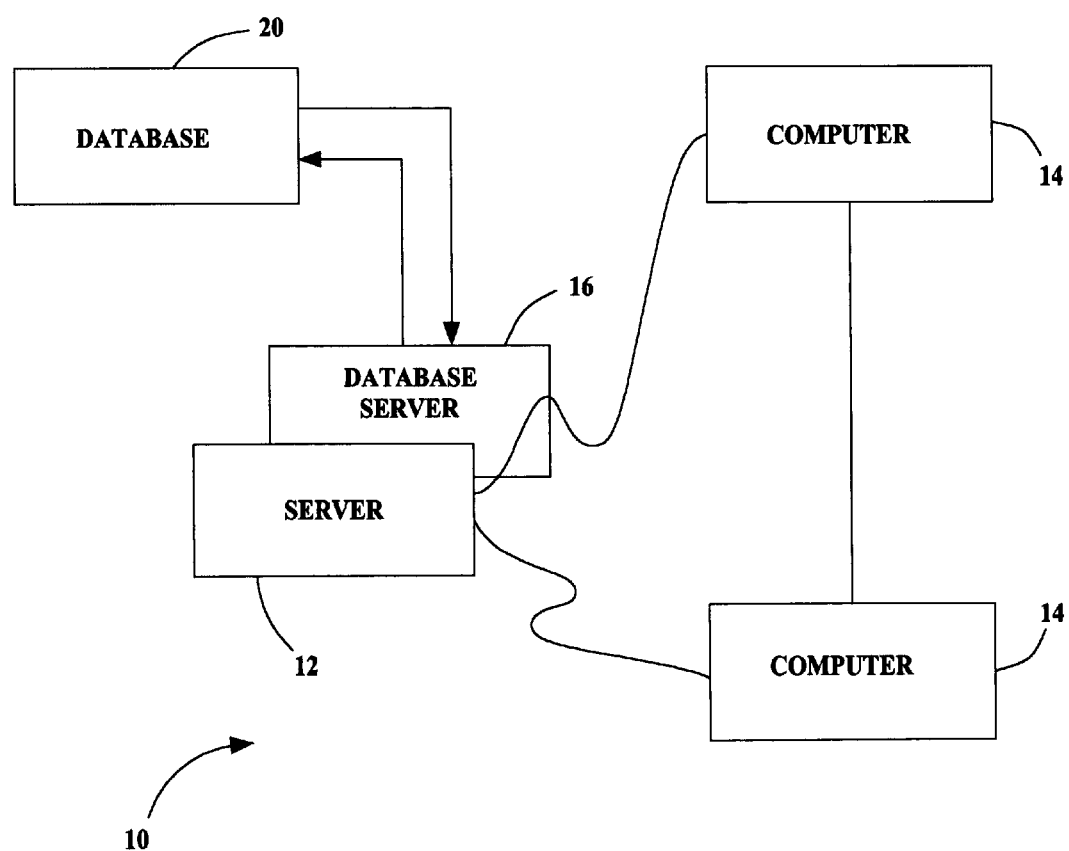
FIG. 1 is a simplified block diagram of an Asset Management System (AMS) in accordance with one embodiment of the present invention.

Exemplary embodiments of systems and processes that facilitate integrated network-based electronic reporting and workflow process management related to the Asset Management System (AMS) are described below in detail. The systems and processes facilitate, for example, electronic submission of information using a client system, automated extraction of information, and web-based assessment reporting for internal and external system users.

The AMS is capable of collecting, tracking and disseminating real time information about Boiling Water Reactor (BWR) internal components (also referred to as "Internals"), Pressurized Water Reactor (PWR) Internals, or Advanced Liquid Metal Reactor (AMLR) Internals. In an exemplary embodiment, a searchable network-based AMS collects, tracks and disseminates real time information regarding Boiling Water Reactor (BWR) internal components. Information relating to each internal component of a specific plant is received by the system which stores the information into a centralized database, updates the centralized database with information received, cross-references the information received against the specific plant, and provides information in response to an inquiry. The system provides solutions to cracked Internals and also plant specific analysis to individual customers. The system allows access to the most recent information, which was previously not possible.

In the AMS, BWR Internals' information is stored in the centralized database. The network based AMS provides convenient access to reactor Internals' information, including Internals' susceptibility, known fleet issues, known unit specific issues, up-to-date unit specific summary of inspections performed, inspection recommendations/guidelines for the components of concern, and contingency options (repair or mitigation). The database is integrated into customer outage planning and markets solutions. Once into the plant's home page, the user has an option to access information on any reactor internal that has been analyzed. The Internals include, but are not limited to, the following: core spray piping, core spray sparger, lower plenum, shroud, shroud support, jet pump, top guide, and core plate.

In an exemplary embodiment, for each reactor internal, the following information can be accessed by a user:

Background—This section provides plant specific configuration drawings, as well as materials and susceptibility information on given welds.

Field History—This section provides up-to-date information on field cracking history.

Inspection—This section provides information on inspection guidelines, plant specific inspection history, and the latest information on inspection techniques.

Mitigation—This section provides information on the mitigation techniques that are applicable to the given component being analyzed.

Repair—This section provides information on the repair options that are applicable to the given component being analyzed.

The AMS provides a formalized process to meet and manage the Internals information pertaining to reactors and also helps achieve full compliance to government regulatory standards. The method utilizes a web application that analyzes either a single plant or multiple plants. For multiple plants, a summary sheet gives a quick overview of where the plants stand with respect to NRC standards. The user has an option to link from the summary sheet to any plant, or can link directly from the home page to any plant.

The systems and processes are not limited to the specific embodiments described herein. In addition, components of each system and each process can be practiced independent and separate from other components and processes described herein. Each component and process also can be used in combination with other components and processes.

The application is being implemented as the Training Database utilizing a Structured Query Language (SQL) with a client user interface front-end for administration and a web interface for standard user input and reports. In an exemplary embodiment, the application is web enabled and being run on a business entity's intranet. In yet another embodiment, the application is fully accessed by individuals having an authorized access outside the firewall of the business entity through the Internet. In a third exemplary embodiment, the application is being run in a Windows NT environment. The application is flexible and designed to run in various different environments without compromising any major functionality.

FIG. 1 is a simplified block diagram of an Asset Management System (AMS) 10 including a server sub-system, also referred to as server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone or other web-based connectable equipment. A database server 16 is connected to a centralized database 20 containing product-related information on a variety of products, as described below in greater detail. In one embodiment, centralized database 20 is stored on server system 12 and can be accessed by potential users at one of client systems 14 by logging onto server system 12 through one of client systems 14. In an alternative embodiment centralized database 20 is stored remotely from server system 12.

Figure 2:
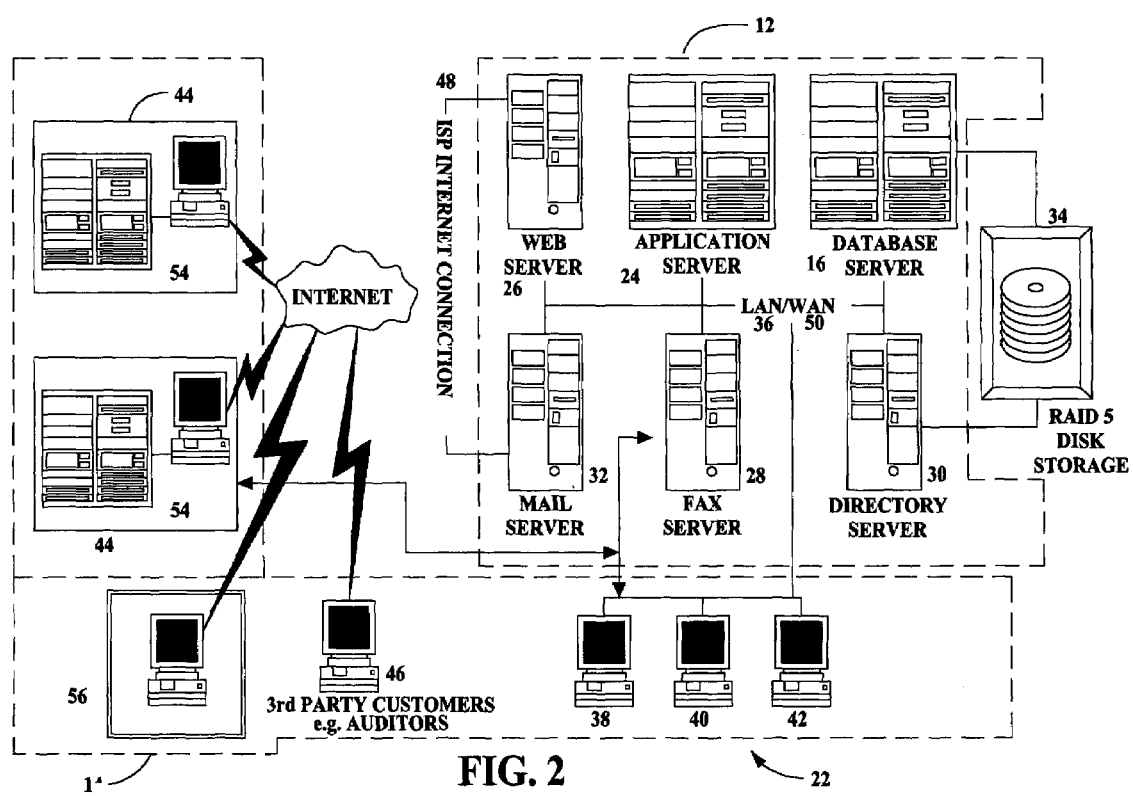
FIG. 2 is an expanded version block diagram of an exemplary embodiment of a server architecture of the AMS.

FIG. 2 is an expanded version block diagram of an exemplary embodiment of a server architecture of an Asset Management System (AMS) 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

In another embodiment, server system 12 is configured to be communicatively coupled to various individuals or employees 44 and to third parties, e.g., internal or external auditors, 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the exemplary embodiment, any authorized individual or an employee of the business entity having a workstation 54 can access the Asset Management System (AMS). One of the client systems includes a senior manager's workstation 56 located at a remote location. Work stations 54 and 56 are personal computers having a web browser. Also, work stations 54 and 56 are configured to communicate with server system 12. Furthermore, fax server 28 communicates with employees located outside the business entity's 44 and any of the remotely located client systems, including a client system 56 via a telephone link. Fax server 28 is configured to communicate with other client systems 38, 40, and 42 as well.

Figure 3:
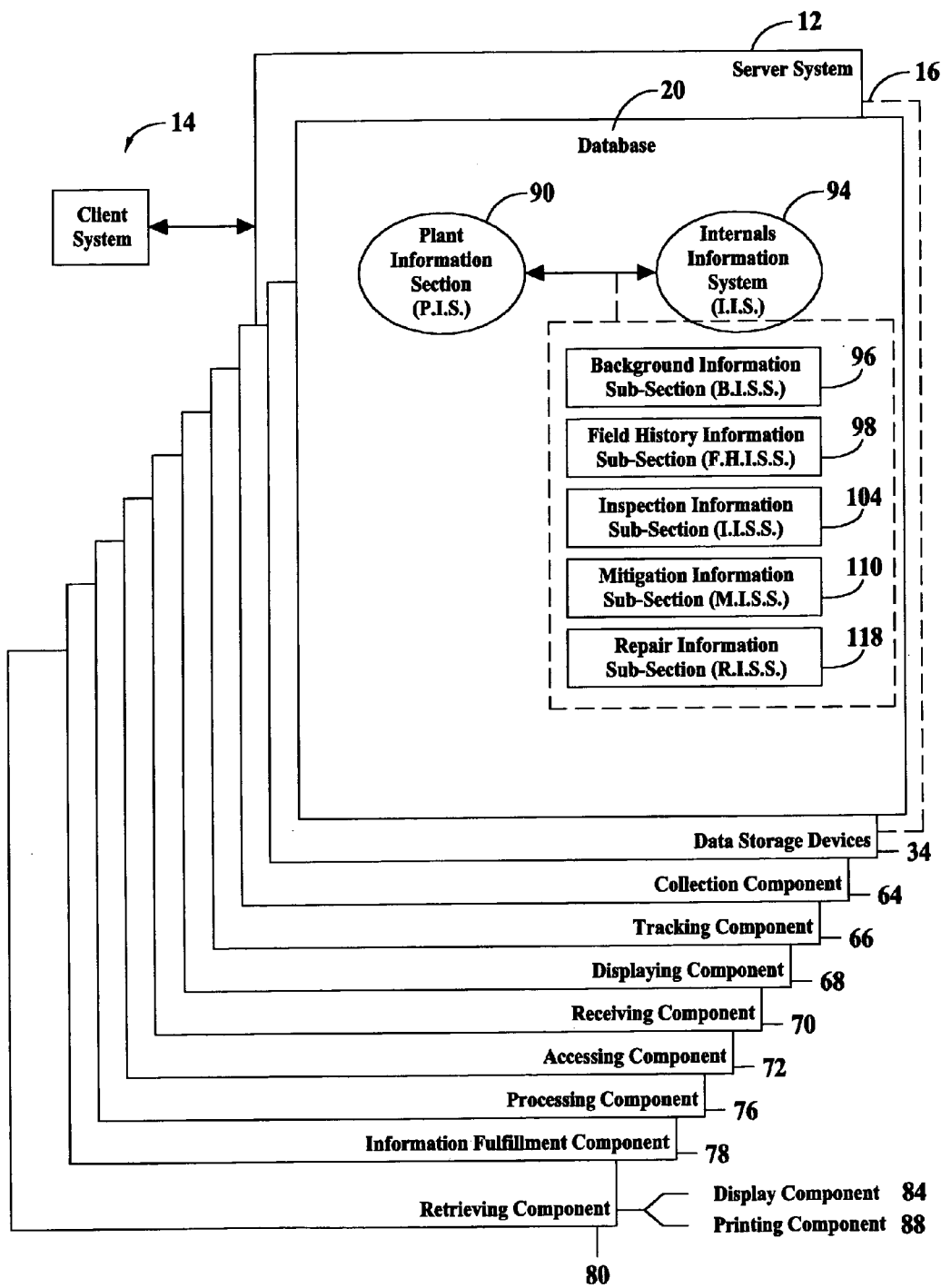
FIG. 3 shows a configuration of a database within the database server of the server system with other related server components.

FIG. 3 shows a configuration of database 20 within database server 16 of server system 12 shown in FIG. 1. Database 20 is coupled to several separate components within server system 12, which perform specific tasks.

Server system 12 includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Receiving component 70 is programmed for receiving a specific query from one of a plurality of users. Server system 12 further includes a processing component 76 for searching and processing received queries against data storage device 34 containing a variety of information collected by collection component 64. An information fulfillment component 78, located in server system 12, downloads the requested information to the plurality of users in the order in which the requests were received by receiving component 70. Information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 further includes a display component 84 configured to download information to be displayed on a client system's graphical user interface and a printing component 88 configured to print information. Retrieving component 80 generates various reports requested by the user through client system 14 in a predetermined format. System 10 is flexible to provide other alternative types of reports and is not constrained to the options set forth above.

Database 20 is divided into a Plant Information Section (PIS) 90, Internals Information Section (IIS) 94 relating to each plant, and several sub-sections underlying each Internals. PIS 90 contains information about various plants including, but not limited to, BWR, PWR, and AMLR. Internals are the components that are used in building the entire system. Internals could vary from plant to plant. The Internals classified in BWR could be different than Internals in PWR and Internals in AMLR. In one of an exemplary embodiment of the inventions, Internals classified for BWR are: Core Spray Internal Piping, Core Spray Sparger, Lower Plenum, Shroud, Shroud Support & Access Hole Cover, Jet Pump Diffuser, Jet Pump Riser & Riser Brace, Jet Pump Inlet Mixer, Jet Pump Sensing Line, Top Guide, and Core Plate.

Several sub-sections underlying each Internals are: a Background Information Sub-Section (BISS) 96 which accumulates data relating to configuration drawings, susceptibility, and so on, a Field History Information Sub-Section (FHISS) 98 involving data relating to each and every Boiling Water Reactors (BWR) installed in the field, an Inspection Information Sub-Section (IISS) 104 identifying data on inspection tools, baseline inspection criteria and overall inspection experience summary pertaining to BWR's, a Mitigation Information Sub-Section (MISS) 110 identifying mitigation methods and a Repair Information Sub-Section (RISS) 118 identifying repair methods. PIS 90, IIS 94, BIIS 96, FHISS 98, IISS 104, MISS 110 and RISS 118 within database 20 are interconnected to update and retrieve the information as required.

System 10 accumulates a variety of personal and confidential data for the business entity. Therefore, system 10 has different access levels to control and monitor the security of the system. Authorization for access is assigned by system administrators on a need to know basis. In an alternative embodiment, system 10 provides access based on job functions. In yet another embodiment of the invention, system 10 provides access based on positions and management authority within the business entity. The administration/editing capabilities within system 10 are also restricted to ensure that only authorized individuals have access to modify or edit the information that is already existing in the system. These internal controls with reference to system security help system 10 to manage and control the access to the information.

The architectures of system 10 as well as various components of system 10 are exemplary only. Other architectures are possible and can be utilized in connection with practicing the processes described below.

FIG. 4 is an exemplary embodiment of a user interface 300 of Asset Management System (AMS) 10 shown in FIG. 2. In one exemplary embodiment, user interface 300 displays different alternative plants to a user through various hypertext links. These linkages include a hypertext link to Dresden 2 plant 310, a hypertext link to Dresden 3 plant 312, a hypertext link to LaSalle 1 plant 316, a hypertext link to LaSalle 2 plant 320, a hypertext link to Quad Cities 1 plant 324, and a hypertext link to Quad Cities 2 plant 328. Each of the plants is managed by a different utility company. User interface 300, also known as an Asset Management System's home page, is linked to database 20. Database 20 is often referred to as the asset management database or the interactive database. Home Page 300 is the entry point for anyone trying to access Asset Management Database 20 via the web. The first step in accessing information is to select an option listed on Home Page 300 and to exercise that selection by selecting "Submit" button (not shown) or clicking the selected hypertext link twice.

Figure 5:
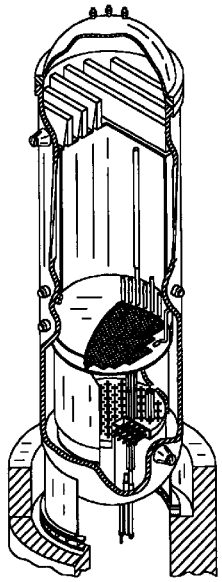
FIG. 5 is an exemplary embodiment of a user interface displaying various internal components of a specific plant (Dresden 2 Plant)

FIG. 5 is an exemplary embodiment of a user interface 340 of Asset Management System (AMS) 10 shown in FIG. 2. In an exemplary embodiment of the invention, user interface 340 is displayed on the client system once the user has selected a hypertext link to Dresden 2 plant (shown in FIG. 4). User Interface 340 displays various internal components (also known as "Internals") for the selection. In a specific embodiment of the invention, the internal components relating to Dresden 2 plant's are: a Core Spray Internal Piping 344, a Core Spray Sparger 350, a Lower Plenum 354, a Shroud 356, a Shroud Support 358 & Access Hole Cover 360, a Jet Pump Diffuser 364, a Jet Pump Riser 368 & Riser Brace 370, a Jet Pump Inlet Mixer 374, a Jet Pump Sensing Line 378, a Top Guide 380, and a Core Plate 384. The internal components may vary from a plant to plant. Once the user has selected a specific component by selecting a hypertext link, system 10 downloads and displays relevant information pertaining to that specific component.

Figure 6:
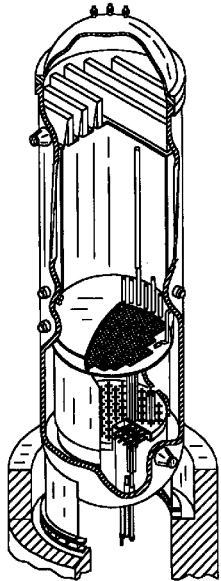
FIG. 6 is an exemplary embodiment of a user interface displaying various internal components of a specific plant (La Salle 1 Plant)

FIG. 6 is an exemplary embodiment of a user interface 400 of Asset Management System (AMS) 10 shown in FIG. 2. In an exemplary embodiment of the invention, user interface 400 is displayed on the client system once the user has selected a hypertext link to La Salle 1 plant (shown in FIG. 4). User Interface 400 displays various Internals (or system components) for the selection. In a specific embodiment of the invention, the internal components relating to La Salle 1 plant's are: a Core Spray Internal Piping 404, a Core Spray Sparger 410, a Lower Plenum 414, a Shroud 416, a Shroud Support 418 & Access Hole Cover 420, a Jet Pump Diffuser 424, a Jet Pump Riser 428 & Riser Brace 430, a Jet Pump Inlet Mixer 434, a Jet Pump Sensing Line 438, an LPCI 440, a Top Guide 442, and a Core Plate 444. System 10 downloads and displays relevant information to the user based on the specific component hypertext link selected by the user.

Figure 7:
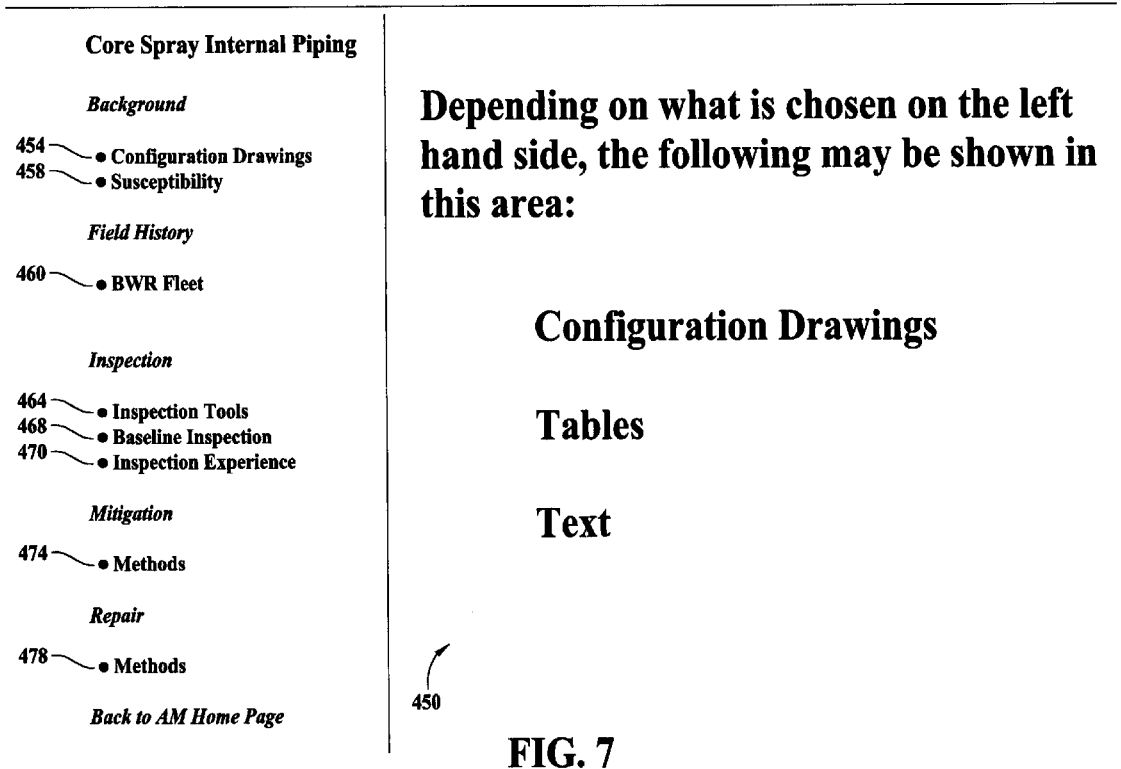
FIG. 7 is an exemplary embodiment of a user interface providing instructions to the user.

FIG. 7 is an exemplary embodiment of a user interface 450 providing instructions to the user. In an exemplary embodiment of the invention, user interface 450 is displayed on the client system once the user has selected a hypertext link to Core Spray Internal Piping 344 (shown in FIG. 5) relating to Dresden 2 plant. The user interface is segregated into two different sections. Based on what the user selects on the left-hand side of the screen display, system 10 downloads and displays the relevant data on the right hand side. In the alternative embodiment of the invention, the selection portion of the screen on the left-hand side can be alternatively arranged for the user convenience. In an exemplary embodiment of the invention, system 10 displays nine different hypertext links providing various options to the user. These hypertext links are: a "Configuration Drawings" hypertext link 454, a "Susceptibility" hypertext link 458, a "BWR Fleet" hypertext link 460, an "Inspection Tools" hypertext link 464, a "Baseline Inspection" hypertext link 468, an "Inspection Experience" hypertext link 470, a "Methods" hypertext link 474 relating to mitigation, a "Methods" hypertext link 478 pertaining to various repairs and a hypertext link 480 to return the user back to the home page.

Figure 8:
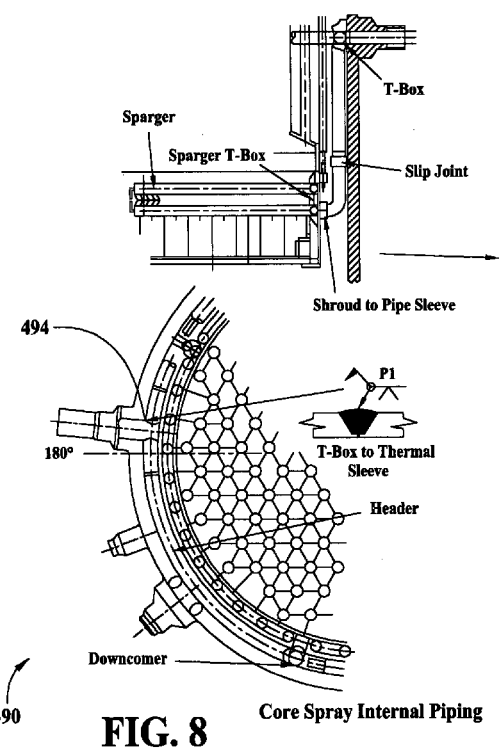
FIG. 8 is an exemplary embodiment of a user interface displaying configuration drawings of a component entitled "Core Spray Internal Piping"

FIG. 8 is an exemplary embodiment of a user interface displaying configuration drawings 490 of a component entitled "Core Spray Internal Piping" when the user has selected a "Configuration Drawings" hypertext link 454 (shown in FIG. 7). On user interface 490, there are active links on the weld callouts, which take the user to a table providing a detail description and susceptibility of the weld. In an exemplary embodiment of the invention, when the user selects a "weld callout P1" 494 through an active link, system 10 displays the user the relevant information (shown in FIG. 9) relating to weld callout 494. Additionally, through user interface 490, the user navigates to a specific drawing out of a plurality of drawings relating to this component. The current drawing number is highlighted for the benefit of the user.

FIG. 9 is an exemplary embodiment of a user interface displaying susceptibility of welds 498 relating to a component entitled "Core Spray Internal Piping" when the user has selected a "Susceptibility" hypertext link 458 (shown in FIG. 7). User interface 498 displays weld callout information which includes a Weld Identification Number 500, a Weld Description 504, Base Material Information 506, Filler Material Information 508, and a Susceptibility Index 510 from 1 to 5 (1 being low and 5 being high). Each of the weld callouts or Weld Identification numbers is provided with the active hypertext link to guide the user back to a configuration drawing (as displayed in FIG. 8). Alternatively, active hypertext links on weld callouts from the configuration drawing (shown in FIG. 8) lead the user back to the weld information table displayed by user interface 498. For example, when the user selects "weld callout P1" 494 shown in FIG. 8, system 10 downloads and displays the entire table which also includes the detail information on weld callout P1. In the corresponding columns, system 10 provides information relevant to P1, which includes a weld description 514, a base material 516, a filler material 518 and a susceptibility index 520 of 3.

FIG. 10 is an exemplary embodiment of a user interface displaying BWR Fleet history information 530 of a component entitled "Core Spray Internal Piping" when the user has selected a "BWR Fleet" hypertext link 460 (shown in FIG. 7). User interface 530 displays a long table, which may be scrolled as necessary by the user. User interface 530 provides valuable field information to the user which includes a problem description 532 for a given plant 534, when the operation commenced 536 at the plant, a product line 538, a date on which the problem was found 540, a cause relating to the problem 544 and a list of any repairs completed to date 548.

FIG. 11 is an exemplary embodiment of a user interface displaying Inspection Tools information 556 for a component entitled "Core Spray Internal Piping" when the user has selected a "Inspection Tools" hypertext link 464 (shown in FIG. 7). User interface 556 displays a summary 560 relating to inspection tools available for a specific component which may be scrolled as necessary by the user. User interface 556 provides information on various types of inspection tools, benefits of inspection tools, and a summary of past experiences relating to inspection tools.

FIG. 12 is an exemplary embodiment of a user interface displaying Baseline Inspection information 564 for a component entitled "Core Spray Internal Piping" when the user has selected a "Baseline Inspection" hypertext link 468 (shown in FIG. 7). User interface 564 displays an Inspection Method 570 for a given Weld Callout Identification 574, a location of weld callout 576 and a location/azimuth 580. Weld callouts are connected with active hypertext links to guide the user to the type of the configuration drawing shown in FIG. 8. For example, it is suggested that a "weld ID number P1" 582 is located at thermal sleeve to a T-box 584 and should be inspected by utilizing a BWRVIP-18 (Boiling Water Reactor Vessel & Internals Project) method 586. The user may go to pictorial depiction (shown in FIG. 8) of "weld P1" 582 by selecting an active hypertext link P1 shown in FIG. 12.

FIG. 13 is an exemplary embodiment of a user interface displaying up-to-date Inspection Experience information 590 for a component entitled "Core Spray Internal Piping" when the user has selected a "Inspection Experience" hypertext link 470 (shown in FIG. 7). User interface 590 displays detail information accumulated to date. In an exemplary embodiment, system 10 downloads and displays a date or a year in which the inspection was undertaken 594, an Inspection method Used 596, a summary relating to Inspection Results and Re-inspections, a Failure Mode and/or location of degradation 600 and any other relevant comments 604.

FIG. 14 is an exemplary embodiment of a user interface displaying up-to-date Mitigation Methods information 610 for a component entitled "Core Spray Internal Piping" when the user has selected a "Methods" hypertext link 474 relating to mitigation (shown in FIG. 7). User interface 610 displays a detail information accumulated to date. In an exemplary embodiment, system 10 downloads and displays a type of the mitigation method 614, welds mitigated 616, status of the mitigation method 620, and a plant or plants where a given method of mitigation was implemented 624. The information is provided in a table format and may be scrolled by the user as required.

FIG. 15 is an exemplary embodiment of a user interface displaying up-to-date Repair Methods information 630 for a component entitled "Core Spray Internal Piping" when the user has selected a "Methods" hypertext link 478 relating to various repairs (shown in FIG. 7). User interface 630 displays detail information accumulated to date. In an exemplary embodiment, system 10 downloads and displays a type of the repair method 634, a type of the weld repaired 636, status of the repair method 638, and a plant or plants where a given method of repair was implemented 640. The information is provided in a table format and may be scrolled by the user as required.

Figure 16:
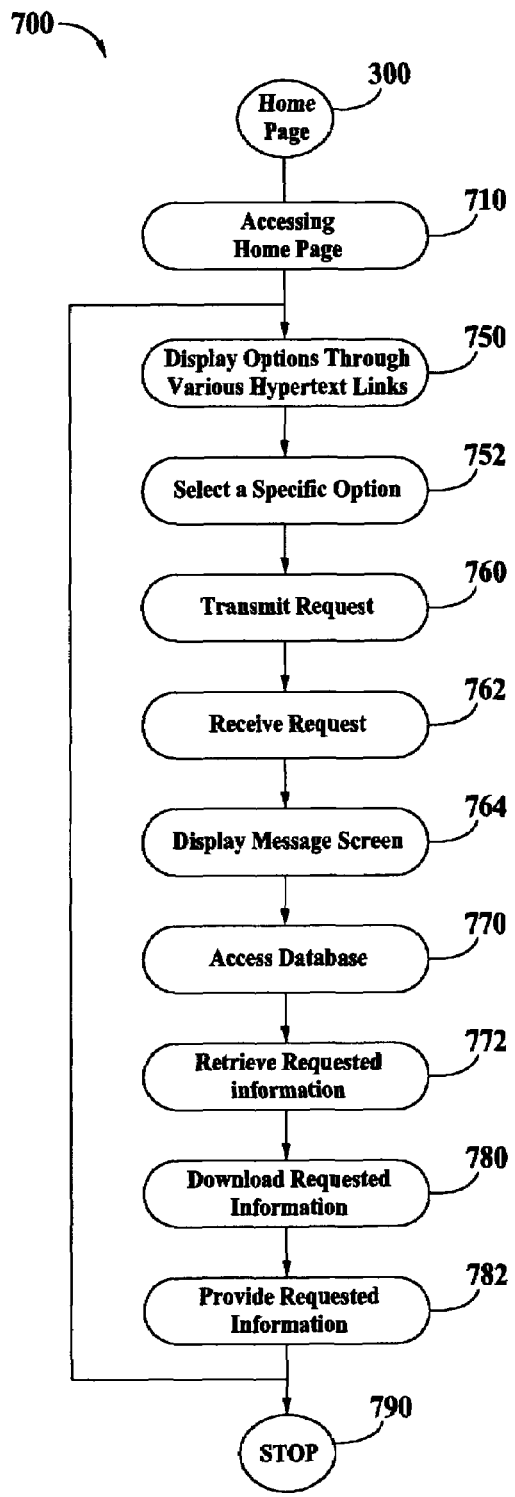
FIG. 16 is an algorithm used by the system to help the user to practice the AMS when the user logs on to a home page of the web site through the client system.

FIG. 16 is an algorithm 700 for Asset Management System (AMS) 10. Initially, the user accesses 710 home page 300 (shown in FIG. 4) of the web site through client system 14 (shown in FIG. 1). Home page 300 displays several options 750 available to the user through various hypertext links. Once the user selects 752 a specific plant from the various hypertext links, the request is transmitted to server system 12. Transmitting the request 760 is accomplished either by click of a mouse or by a voice command. Once server system 12 (shown in FIG. 1) receives 762 the request, server system 12 displays 764 the message to the user relating to the plant selected and provides a list of internal components pertaining to the selected plant. In an alternative embodiment of the invention (not shown), the user is requested to log-in to the system using the social security number or an employee payroll number for the security purpose. Server system 12 accesses 770 database server 16 and retrieves 772 related information from database 20 (shown in FIG. 1). The requested information is downloaded 780 and provided 782 to client system 14 from server 12. The user continues to search database 20 for other information or exits 790 from AMS 10. In one embodiment, client system 14, as well as server system 12, are protected from access by unauthorized individuals. As described, AMS 10 includes an interactive searchable database 20 for all information related to various plants and their internal components which provides flexibility to management to maintain repair and safety related information. AMS 10 reduces paper-based information by providing on-line up-to-date current information, which is essential in day-to-day management of the regulated industries.

In addition, AMS 10 provides electronic customer notification flexibility (not shown) that includes notification of industry events including, but not limited to, updated inspection guidelines, new industry component findings, new Safety Information Letters (SILs), new repair and/or mitigation options. This notification may be in the form of an e-mail that is automatically generated to the customer, or a note on a Customer Web Center. Although AMS is launched as a stand-alone application, in an alternative embodiment of the invention, AMS resides under the Customer Web Center.

In an alternative embodiment (not shown), AMS flexibility also includes capability to dynamically generate tables which always the customer to always get the latest information at all times on BWR fleet history, inspection guidelines, inspection techniques, mitigation options, and repair options. AMS further provides single point access to plant specific data such as stress reports, configuration drawings, inspection reports, repair specifications, etc. Single point access capability further includes single point access to fleet data such as Safety Information Letters, fleet cracking data, repair installations, mitigation installations, and Non-destructive Engineering (NDE) information including detailed inspection reports and on-line NDE data.

AMS's analytical tools allow the customer to perform detailed evaluations of the customer's inspection findings and to predict future failures relating to a component based on stored historical information. AMS's Outage contingency tools provide contingencies for the most susceptible components, and automatically generate contingency outage schedule, and contact information for ways of reducing outage impact. AMS provides valuable services to the customer as well as service personnel who are involved in supporting a plant. AMS's database provides component specific historical information, which helps the service personnel in analyzing and solving a specific problem.

While the invention has been described in terms of various specific embodiments, those skilled in the art will recognize that the invention can be practiced with modification within the spirit and scope of the claims.

What is claimed is:

1. A method for managing internal components of nuclear reactor plants using a network-based system including a server system coupled to a centralized interactive database and at least one client system, said method comprising the steps of:

receiving information relating to internal components of a specific plant;

storing the information into a centralized database;

updating the centralized database with information received;

cross-referencing the information received against the specific plant;

developing inspection recommendations for specific internal components based on information received and information stored in the database;

determining cracking susceptibility for specific internal component welds based on information received and information stored in the database, wherein the cracking susceptibility determination is based on a base material of the internal component, a weld filler material, and a weld susceptibility index based on a configuration of a weld and historical information of similar internal components in similar reactors;

developing contingency options for repair or mitigation of specific internal components based on the cracking susceptibility of specific component welds;

generating contingency outage schedules for the contingency options; and providing information in response to an inquiry.

2. A method according to claim 1 wherein said step of receiving information further comprises the step of receiving data for at least one of a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate.

3. A method according to claim 1 wherein said step of receiving information further comprises the step of receiving data for at least one of a plurality of nuclear reactor plants.

4. A method according to claim 1 wherein said step of receiving information further comprises the step of receiving data for at least one of a Boiling Water Reactor Plant, Pressurized Water Reactor Plant, and an Advanced Liquid Metal Reactor Plant.

5. A method according to claim 1 wherein said step of storing information further comprises the step of storing data for at least one of a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate.

6. A method according to claim 1 further comprising selecting a specific repair or mitigation option for each specific internal component.

7. A method according to claim 6 further comprising developing a repair schedule for the specific components that coincides with scheduled reactor plant shutdowns.

8. A method according to claim 1 wherein said step of storing information further comprises the step of storing configuration drawings section providing details about the plant specific configuration of a specific component including weld callouts.

9. A method according to claim 1 wherein said step of storing information further comprises the step of storing susceptibility data providing detail information about a given weld including a base material, a filler material and a susceptibility ranking, the susceptibility ranking based on configuration of the weld and fleet historical information.

10. A method according to claim 1 wherein said step of storing information further comprises the step of storing fleet information.

11. A method according to claim 10 wherein said step of storing fleet information further comprises the step of storing fleet cracking information which includes at least one of a where a crack occurred, when a crack occurred, in which plant a crack occurred, details about cracking, a cause related to cracking, any repair information relating to the crack, and a summary of the results of the cracking.

12. A method according to claim 1 wherein said step of storing information further comprises the step of storing Inspection Tool information including capabilities and qualifications.

13. A method according to claim 1 wherein said step of storing information further comprises the step of storing Baseline Inspection information, which includes recommended inspection criteria.

14. A method according to claim 1 wherein said step of storing information further comprises the step of storing Inspection Experience information.

15. A method according to claim 1 wherein said step of storing information further comprises the step of storing Mitigation Methods providing information on various mitigation options for a specific component.

16. A method according to claim 1 wherein said step of storing information further comprises the step of storing Repair Methods that are available for a specific component.

17. A method according to claim 16 wherein said step of storing repair methods further comprises the step of storing at least one of a repair method, details about the repair method, who has implemented the repair method, how long it takes to implement the repair method, and a contact information.

18. A method according to claim 1 wherein said step of storing the information into a centralized database further comprises the steps of:
   storing the information against a component identifier;
   storing the information against a plant identifier; and
   storing the information against the employee identifier.

19. A method according to claim 18 wherein said step of downloading the information in response to the inquiry further comprises the steps of:
   accessing the centralized database;
   searching the database regarding the specific inquiry;
   retrieving information from the database; and
   transmitting the retrieved information to the client system for display by the client system.

20. A method according to claim 1 wherein said step of storing information further comprises the steps of:
   tracking information on a real time basis; and
   storing information on a real time basis by updating stored information by adding the new information to the centralized database on a real time basis to provide up-to date information instantaneously to the user upon a request.

21. A method according to claim 1 wherein said step of updating the centralized database further comprises the step of entering information on-line.

22. A method according to claim 21 wherein said step of entering information further comprises the step of entering information at least through one of a voice activation command and a device connected to the client system.

23. A method according to claim 1 wherein said step of providing information in response to an inquiry further comprises the steps of:
   downloading requested information from a server system; and
   displaying requested information on a client system in response to the inquiry.

24. A method according to claim 1 wherein said step of providing information further comprises the step of printing requested information.

25. A method according to claim 1 wherein said step of providing information further comprises the step of accepting an inquiry from a user.

26. A method according to claim 1 wherein said step of accepting an inquiry further comprises the steps of:
   displaying information on the client system identifying at least one of an option relating to a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate; and
   receiving an inquiry from the client system regarding at least one of an option relating to a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate.

27. The method according to claim 26 wherein said step of displaying information further includes the step of displaying an HTML document downloaded by the server system.

28. A method according to claim 26 wherein said step of displaying further comprises the step of displaying at least one alternative from various alternatives available to the user.

29. A method according to claim 1 wherein said step of accepting an inquiry further comprises the steps of:
displaying information on the client system identifying at least one of an option relating to a specific nuclear reactor plant; and
receiving an inquiry from the client system regarding at least one of an option relating to the specific nuclear reactor plant.

30. A method according to claim 26 wherein said step of receiving an inquiry from the client system further includes the step of submitting a request through pull down menus.

31. The method according to claim 1 wherein the client system and the server system are connected via a network and wherein the network is one of a wide area network, a local area network, an intranet and the Internet.

32. A network-based system for managing assets, said system comprising:
a client system comprising a browser;
a data storage device for storing information;
a server system configured to be coupled to said client system and said database, said server system further configured to:
receive information relating to internal components of a specific plant;
store the information into a centralized database;
update the centralized database with information received;
cross-reference the information received against the specific plant;
develop inspection recommendations for specific internal components based on information received and information stored in the database;
determine cracking susceptibility for specific internal component welds based in information received and information stored in the database, wherein the cracking susceptibility determination is based on a base material of the internal component, a weld filler material, and a weld susceptibility index based on a configuration of a weld and historical information of similar internal components in similar reactors;
develop contingency options for repair or mitigation of specific internal components based on the cracking susceptibility of specific component welds;
generate contingency outage schedules for the contingency options; and
provide information in response to an inquiry.

33. A system according to claim 32 wherein said client system is further configured with:
a displaying component for displaying at least one of an option relating to a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate; and
a sending component to send an inquiry to the server system so that the server system can process and download the requested information to the client system.

34. A system according to claim 33 wherein the sending component functions in response to a click of a mouse button.

35. A system according to claim 33 wherein the sending component functions in response to a voice command.

36. The client system of claim 33 wherein said system is further configured to be protected from access by unauthorized individuals.

37. A system according to claim 33 wherein said server system is further configured with:
a collection component for collecting information from users into the centralized database;
a tracking component for tracking information on an on-going basis;
a displaying component for displaying information on at least one of an option relating to a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate;
a receiving component for receiving an inquiry from the client system regarding at least one of an option relating to a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate; and
an accessing component for accessing the centralized database and causing the retrieved information to be displayed on the client system.

38. A system according to claim 37 wherein said server system further configured with a receiving component for receiving an inquiry to provide information from one of a plurality of users.

39. A system according to claim 37 wherein said server system further configured with a processing component for searching and processing received inquiries against the data storage device containing a variety of information collected by the collection component.

40. A system according to claim 37 wherein said server system further configured with a retrieving component to retrieve information from the data storage device.

41. A system according to claim 37 wherein said server system further configured with an information fulfillment component that downloads the requested information after retrieving from the data storage device to the plurality of users in the order in which the requests were received by the receiving component.

42. A system according to claim 32 wherein said server system further configured to receive data for at least one of a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate.

43. A system according to claim 32 wherein said server system further configured to receive data for at least one of a plurality of plants.

44. A system according to claim 32 wherein said server system further configured to receive data for at least one of a Boiling Water Reactor Plant, Pressurized Water Reactor Plant, and an Advanced Liquid Metal Reactor Plant.

45. A system according to claim 32 wherein said server system further configured to store data for at least one of a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate.

46. A system according to claim 32 wherein said server system further configured to store data for at least one of a plurality of plants.

47. A system according to claim 32 wherein said server system further configured to store data for at least one of a Boiling Water Reactor Plant, Pressurized Water Reactor Plant, and an Advanced Liquid Metal Reactor Plant.

48. A system according to claim 32 wherein said server system further configured to store configuration drawings section providing details about the plant specific configuration of a specific component including weld callouts.

49. A system according to claim 32 wherein said server system further configured to store susceptibility data providing detail information about a given weld including a base material, a filler material and a susceptibility ranking, the susceptibility ranking based on configuration of the weld and fleet historical information.

50. A system according to claim 32 wherein said server system further configured to store fleet information.

51. A system according to claim 32 wherein said server system further configured to store fleet cracking information which includes at least one of a where a crack occurred, when a crack occurred, in which plant a crack occurred, details about cracking, a cause related to cracking, any repair information relating to the crack, and a summary of the results of the cracking.

52. A system according to claim 32 wherein said server system further configured to store Inspection Tool information including capabilities and qualifications.

53. A system according to claim 32 wherein said server system further configured to store Baseline Inspection information, which includes recommended inspection criteria.

54. A system according to claim 32 wherein said server system further configured to store Inspection Experience information.

55. A system according to claim 32 wherein said server system further configured to store Mitigation Methods providing information on various mitigation options for a specific component.

56. A system according to claim 32 wherein said server system further configured to store Repair Methods that are available for a specific component.

57. A system according to claim 32 wherein said server system further configured to store at least one of a repair method, details about the repair method, who has implemented the repair method, how long it takes to implement the repair method, and a contact information.

58. A system according to claim 32 wherein said server system further configured to select a specific repair or mitigation option for each specific component.

59. A system according to claim 58 wherein said server system further configured to develop a repair schedule that coincides with scheduled plant shutdowns.

60. A system according to claim 32 wherein said server system further configured to:
store the information against a component identifier;
store the information against a plant identifier; and
store the information against the employee identifier.

61. A system according to claim 32 wherein said server system further configured to:
track information on a real time basis; and
store information on a real time basis by updating stored information by adding the new information to the centralized database on a real time basis to provide up-to date information instantaneously to the user upon a request.

62. A system according to claim 32 wherein said server system further configured to enter information on-line.

63. A system according to claim 62 wherein said server system further configured to enter information at least through one of a voice activation command and a device connected to the client system.

64. A system according to claim 32 wherein said server system configured to provide information in response to an inquiry further configured to:
download requested information from a server system; and
display requested information on a client system in response to the inquiry.

65. A system according to claim 32 wherein said server system further configured to print requested information.

66. A system according to claim 32 wherein said server system further configured to accept an inquiry from a user.

67. A system according to claim 32 wherein said server system further configured to:
display information on the client system identifying at least one of an option relating to a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate; and
receive an inquiry from the client system regarding at least one of an option relating to a Core Spray Internal piping, a Core Spray Sparger, a Lower plenum, a Shroud, a Shroud support and Access Hole Cover, a Jet Pump Diffuser, a Jet Pump Riser and riser Brace, a Jet Pump Inlet Mixer, a Jet Pump Sensing Line, an LPCI, a Top Guide 4, and a Core Plate.

68. A system according to claim 67 wherein said server system further configured to submit a request through pull down menus.

69. A system according to claim 67 wherein said server system further configured to display an HTML document downloaded by the server system.

70. A system according to claim 67 wherein said server system further configured to display at least one alternative out of various alternatives available to the user.

71. A system according to claim 32 wherein said server system further configured to:
display information on the client system identifying an option relating to at least one of a plurality of plants; and
receive an inquiry from the client system regarding an option relating to at least one of a plurality of plants.

72. A system according to claim 32 wherein said server system further configured to:
track information on a real time basis; and
store information on a real time basis by adding new information to the centralized database on a real time basis to provide up-to date information instantaneously to the user upon a request.

73. A system according to claim 32 wherein said server system further configured to receive information entered on-line.

74. A system according to claim 73 wherein said server system further configured to receive information entered through at least one of a voice activation command and a device connected to the client system.

* * * * *